«12» United States Patent
Al-Sarra et al.

(10) Patent No.: US 9,187,345 B2
(45) Date of Patent: Nov. 17, 2015

(54) CHITOSAN DERIVATIVE, A METHOD FOR ITS PREPARATION AND ITS USE AS AN ADSORPTION AGENT

(75) Inventors: Ibrahim Abdallah Al-Sarra, Riyadh (SA); Fars Kaed Alanazi, Riyadh (SA); Awwad Abdoh Radwan, Riyadh (SA)

(73) Assignee: King Saud University, Riyadh (SA)

( * ) Notice: Subject to any disclaimer, the term of this patent is extended or adjusted under 35 U.S.C. 154(b) by 245 days.

(21) Appl. No.: 14/114,777

(22) PCT Filed: Jun. 27, 2012

(86) PCT No.: PCT/EP2012/002696
§ 371 (c)(1),
(2), (4) Date: Oct. 30, 2013

(87) PCT Pub. No.: WO2013/000567
PCT Pub. Date: Jan. 3, 2013

(65) Prior Publication Data
US 2014/0083947 A1    Mar. 27, 2014

(30) Foreign Application Priority Data

Jun. 28, 2011  (EP) .................................. 11171632

(51) Int. Cl.
*C02F 1/42* (2006.01)
*C02F 1/28* (2006.01)
*C08B 37/08* (2006.01)
*B01J 20/24* (2006.01)
*B01J 20/34* (2006.01)
*B01J 20/26* (2006.01)
*C02F 101/20* (2006.01)

(52) U.S. Cl.
CPC . *C02F 1/42* (2013.01); *B01J 20/24* (2013.01); *B01J 20/267* (2013.01); *B01J 20/3425* (2013.01); *B01J 20/3475* (2013.01); *C02F 1/286* (2013.01); *C08B 37/003* (2013.01); *B01J 2220/4825* (2013.01); *C02F 2101/20* (2013.01)

(58) Field of Classification Search
None
See application file for complete search history.

(56) References Cited

PUBLICATIONS

A.A. Radwan et al.; "Microwave Irradiation-Assisted Synthesis of a Novel Crown Ether Crosslinked Chitosan as a Chelating Agent for Heavy Metal Ions (M+n)"; Molecules, vol. 15, 2010, pp. 6257-6268.
PCT/EP2012/002696; PCT International Search Report and Written Opinion of the International Searching Authority dated Aug. 27, 2012.

*Primary Examiner* — Kamal Saeed
(74) *Attorney, Agent, or Firm* — Renner, Otto, Boisselle & Sklar, LLP

(57) ABSTRACT

The present invention relates to a cross-linked thiazolidinone chitosan dibenzo crown ether, a method for its preparation as well as its use as adsorbent.

13 Claims, 1 Drawing Sheet

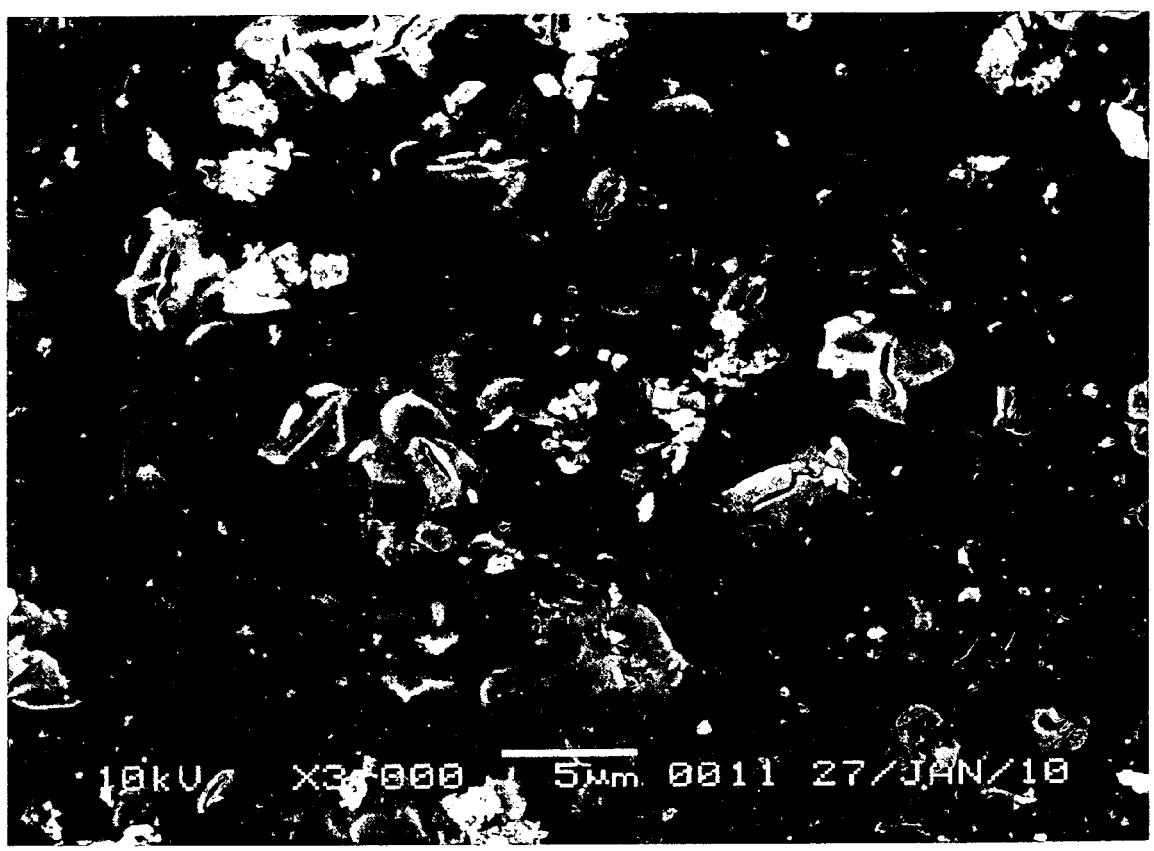

CHITOSAN DERIVATIVE, A METHOD FOR ITS PREPARATION AND ITS USE AS AN ADSORPTION AGENT

The present application is a U.S. National Stage Application based on and claiming benefit of and priority under 35 U.S.C. §371 to International Application No. PCT/EP2012/002696, filed 27 Jun. 2012, which in turn claims benefit of and priority to European Application No. 11171632.0, filed 28 Jun. 2011, the entirety of each of which is hereby incorporated herein by reference.

The present invention relates to a chitosan derivative, a method for its preparation and its use as an adsorption agent.

Heavy metals are highly toxic already at low concentrations and can accumulate in living organisms, causing several disorders and diseases. As a result of industrialization and urbanization, the presence of heavy metal ions in water streams has readily increased in the last 50 years. Removal of heavy metal ions from wastewater is essential because of their extreme environmental, public health, and economic impacts.

The main techniques that have been used on metal content reduction from industrial waste are chemical precipitation, ion exchange, membrane filtration, electrolytic methods, reverse osmosis, solvent extraction, and adsorption. However, these methods are limited by high operational cost and/or may also be inefficient in the removal of some toxic metal ions, mainly at trace level concentrations (Evans, J. R. et al, Water Research 2002, 36, 3219-3226; Rangel-Mendez, J. R. et al, J Hazard Mater 2009, 162, 503-511).

Some of the best chelation ion-exchange materials consist of different biopolymers and their derivatives because of the variety of functional groups, like —OH and —NH$_2$, with which several compounds, e.g., metal ions, can easily react or be bound. These biopolymers, including cellulosics, alginates, proteins, chitin, and chitin derivatives, have remarkable capabilities of lowering metal ion concentrations to parts per billion levels. For example, chitosan (CTS), a deacetylation derivative of chitin, can adsorb metals owing to its amino and hydroxyl groups. However, CTS can be dissolved in acidic media so it limits its recycling in adsorption processes. Crosslinked chitosan synthesized by the reaction of CTS with hydrophobic crosslinking agents can overcome this disadvantage of CTS and still keep good adsorption properties for many metal ions. Also, modifications to increase the number of binding sites and/or binding surfaces of chitosan have been made both by substitution on the amino group at C-2 or by crosslinking the polyglycans with suitable agents.

Crosslinking CTS with biomass/biopolymers like alginate, chelators like ethylenediamine tetraacetic acid (EDTA), fixatives like glutaraldehyde (GA) or polymers like polyvinyl alcohol (PVA), creates a three-dimensional network within the biopolymer and increases the internal surface area for metal adsorption.

Increase in structural and chemical stability of these cross-linked derivatives contributes to the resistance and endurance towards acid from surface and subsurface groundwater, thereby improving water/sewage purification treatments.

Crown ethers have good and different complex selectivity for many metal ions. Unfortunately, they can not be recycled easily after utilization. Therefore, their applications are limited. If crown ethers are crosslinked to chitosan, these novel chitosan derivatives have stronger complex formation with better selectivity for metal ions than corresponding crown ethers and chitosan separately (Yi, Y. et al, Carbohydrate Polymers 2003, 53, 425-430).

A. A. Radwan et al., Molecules 2010, 15, 6257-6268 discloses the preparation of a Schiff base type cross-linked chitosan crown ether and its use for the complexation of heavy metal ions.

It is an object of the present invention to provide a chitosan derivative which overcomes the drawbacks of the prior art, especially exhibiting an enhanced porosity, a high chemical stability, especially an increased resistance to dissolution in acidic media, an increased adsorption capacity for metal ions and an easy and efficient recyclability.

Further, a method for the preparation of chitosan derivatives shall be provided.

Finally, it is a further object of the invention to provide easy use of these chitosan derivatives.

The first object is achieved by a chitosan derivative having the repeating unit of formula 1

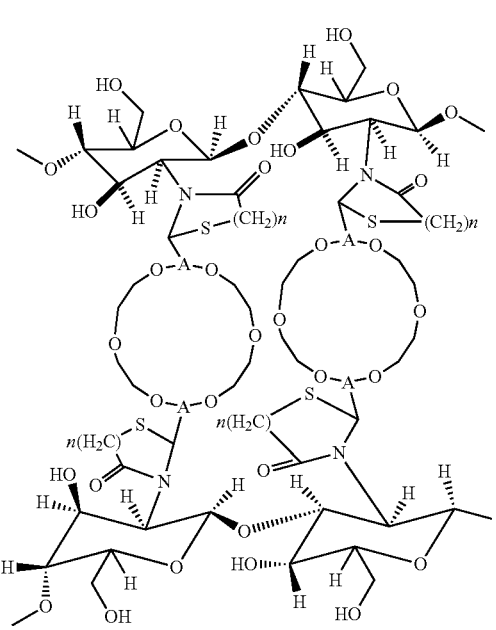

wherein each A is independently selected from

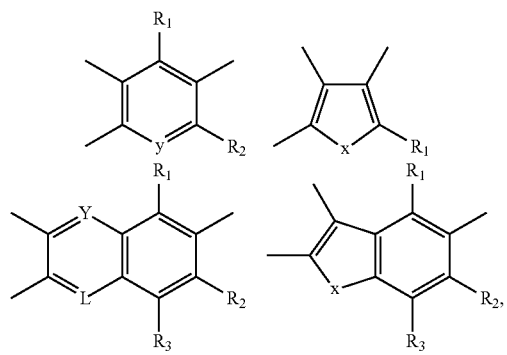

A is vicinally bound to the crown ether,
n equals 1 or 2,
X is selected from CHR$_4$, NH, O or S, preferably X is CHR$_4$ or S,
Y is selected from CR$_4$ or N, preferably Y is CR$_4$,
L is selected from CR$_5$ or N, preferably L is CR$_5$, $R_1$, $R_2$, $R_3$, $R_4$ and $R_5$ are independently selected from hydrogen, halogen, $C_1$-$C_{20}$-alkyl, $C_1$-$C_{20}$-alkoxy, mercapto, alkylthio, alkylamino, arylthio, heteroarylthio, arylamino and heteroarylamino.

The chitosan derivatives according to the invention are most preferably cross linked to 100%. Since in the inventive method the cross linked chitosan was prepared by reaction of chitosan with molar excess of crown ether. This can be evidenced by disappearance of the $NH_2$ group in the NMR data in addition to complete insolubility in acid medium.

The second object is achieved by a method for preparing a chitosan derivative comprising the step:
(i) reacting a cross-linked chitosan crown ether (7) with an alpha-mercapto carboxylic acid and/or a beta-mercapto carboxylic acid to result in a chitosan derivative (1), according to the following scheme 1:

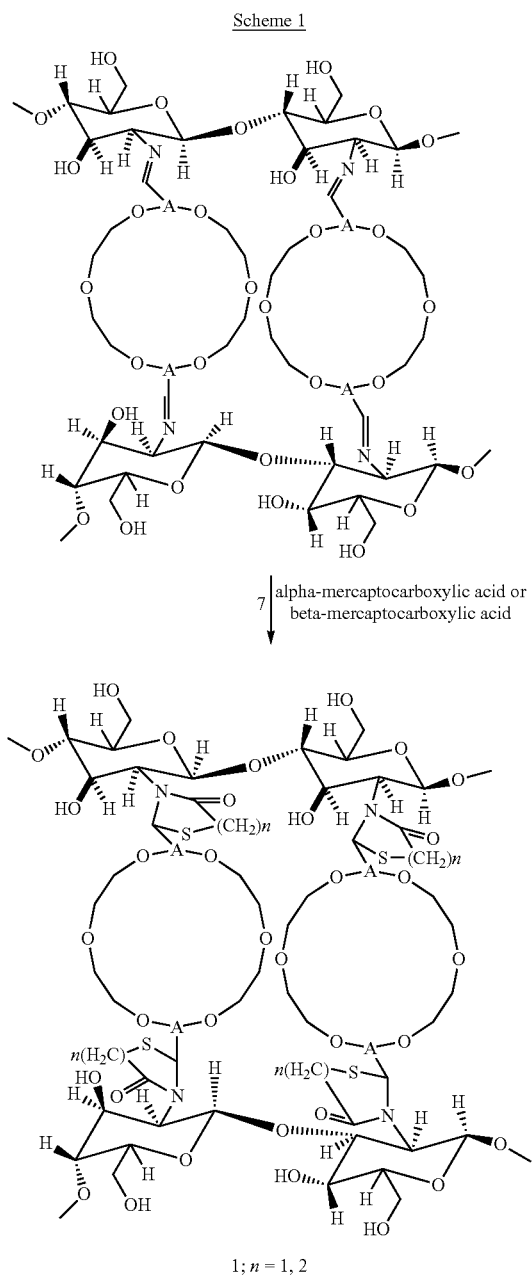

Preferably, step (i) takes place in the presence of an inorganic salt and an organic solvent in a temperature range from 50-150° C., preferably in a temperature range from 75-125° C., preferably, in a temperature range from 100-110° C.

The cross-linked chitosan crown ether compound (7) can be prepared according to literature, such as A. A. Radwan et al., Molecules 2010, 15, 16257-16268 according to the following scheme:

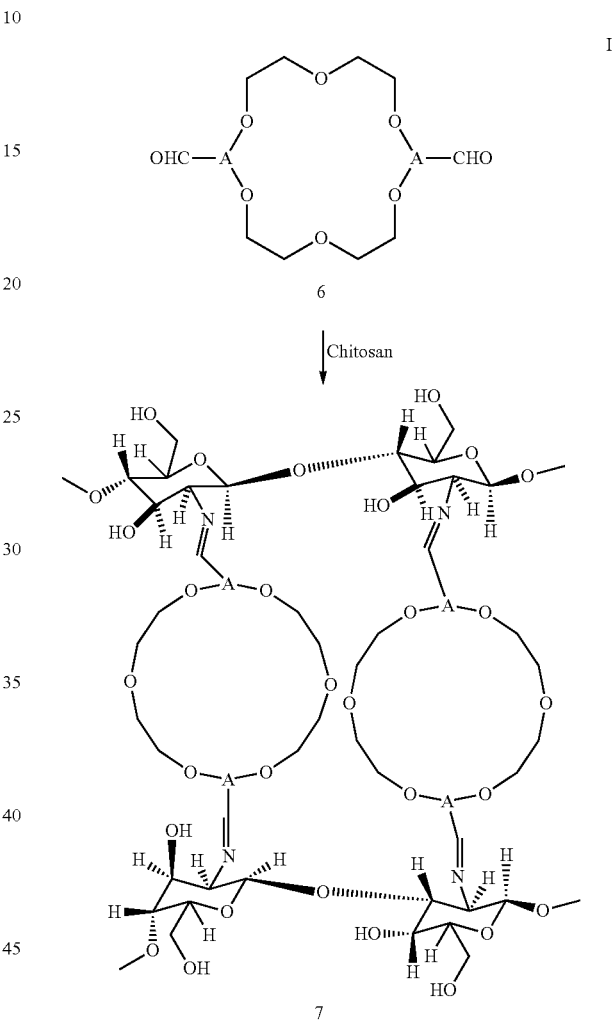

Preferably, the alpha-mercaptocarboxylic acid is mercaptoacetic acid.

Also preferred the beta-mercaptocarboxylic acid is beta-mercaptopropionic acid.

In a preferred embodiment the inorganic salt is zinc chloride.

Preferably the organic solvent is 1,4-dioxane.

In a preferred embodiment step (i) takes place under microwave irradiation.

In another preferred embodiment, the power of the microwave irradiation is in a range from 30-300 W, preferably in a range from 50-150 W, preferably in a range from 75-85 W.

It is also preferred that the irradiation time is in a range from 1-60 min, preferably in a range from 5-30 min, preferably 10 min.

Finally, according to the invention is the use of the chitosan derivative according to formula 1 for the adsorption of metal ions.

In a preferred embodiment the metal ions are heavy metal ions.

More preferred the metal ions are silver, gold, platinum, lead and/or mercury ions.

Most preferred the metal ions are lead and/or mercury ions.

More preferred the acid used for acidic treatment is diluted hydrochloric acid.

In another preferred embodiment, the metal ions are removed from water, preferably waste water, more preferably industrial waste water.

In a preferred embodiment the chitosan derivative of the formula 1 is used for the separation of mercury ions from other metal ions by selective adsorption.

It is obvious to one skilled in the art in knowledge of A. A. Radwan et al., *Molecules* 2010, 15, 6257-6268 that the compound of the formula 7 can be easily achieved by the reaction of a crown ether of the formula 6 and chitosan.

It is also obvious that the terminal dashes in the formula of the fragments A do not represent methyl groups but options for binding to the chitosan or the crown ether. This can be best accomplished by the following detailed example of a chitosan derivative falling under formula 1:

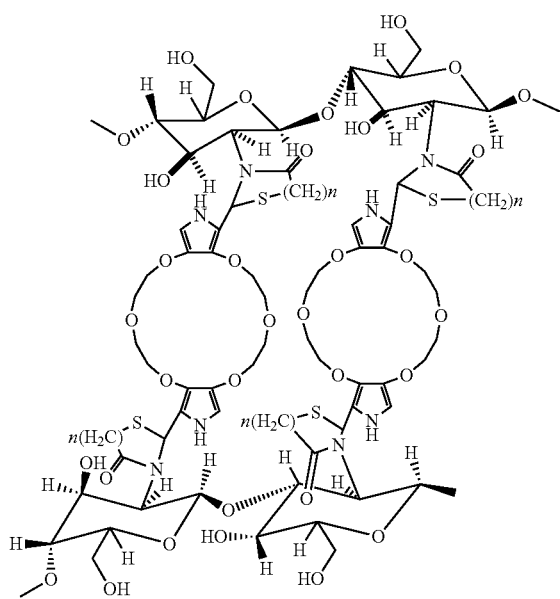

Surprisingly, it was found that the thiazolidinone derivatives of crown ether cross-linked chitosan according to the invention overcome the drawbacks of the prior art by exhibiting higher porosity, being insoluble in acidic solutions and featuring increasing binding affinity towards metal ions compared to chitosan or other crown ether cross-linked chitosan known for this proposal.

Also, the inventors of the present application have surprisingly found an easy method for the preparation of thiazolidone derivatives of crown ether cross-linked chitosan by the reaction of mercaptocarboxylic acids with a Schiff type cross-linked crown ether chitosan, and that the reaction can be carried out thermally as well as under microwave irradiation.

Finally, it was surprisingly found that after the adsorption of metal ions the thiazolidinone derivatives of crown ether cross-linked chitosan according to the present invention can be recycled several times by acidic treatment and subsequent filtration and washing. This easy recycling procedure is feasible due to the surprising low solubility in acidic aqueous media.

The invention will now be described in more detail by the following examples to exemplify the invention, with reference to the accompanying drawing wherein FIG. 1 illustrates a scanning electron microscopy image of CTdBE according to the present invention. The examples, however, are not intended to have limiting effect on the subject-matter of the claims or on the scope of protection.

EXAMPLE 1

Preparation of Cross-Linked Thiazolidinone Chitosan Dibenzo Crown Ether (CTdBE)

Method a:

Schiff base type cross-linked chitosan dibenzocrown ether (CCdBE) (1 g) was mixed with 1 g of mercaptoacetic acid in a 250 ml round bottom flask containing 10 ml of 1,4-dioxane and 20 mg of zinc chloride. After refluxing overnight the reaction mixture was cooled, filtered and the obtained residue washed with water several times and subsequently dried under reduced pressure overnight, giving brownish-beige solid.

Method b:

Mercaptoacetic acid (1 g) was added to CCdBE (1 g). The reaction mixture was irradiated in a microwave oven (MW domestic type oven 800 W DAEWOO) at 10% intensity for 10 min. After cooling to room temperature the residue was filtered and washed with water. The residue was dried under reduced pressure overnight giving beige fibrous solid.

Solid state $^{13}$C NMR spectra were done, at Center for Pharmaceutical Biotechnology University of Illinois at Chicago USA, on a Broker Avance operating at 500 MHz $^1$H frequency with a Broker magic angle spinning probe with 4 mm diameter rotors. CPMAS spectra were collected at 9 kHz spinning speed and 55 kHz Two-Pulse Phase Modulation (TPPM) decoupling. Cross Polarization Magic Angle Spinning (CPMAS) spectrum of sample CTdBE is obtained. Conclusions that can be drawn from the spectra are listed in bullet point format below that lead to a reasonable conclusion that the thiazolidinone ring is formed in sample CTdBE.

- The spectrum shows carbonyl carbons between 180 and 170 ppm and methyl carbons at ~25 ppm. This is consistent with incomplete deacylation of chitosan.
- Linewidths are between 200 Hz and 800 Hz which is consistent with amorphous compounds and previously published work on Chitosan.
- There is some decrease in the C=N signal at ~150 ppm, as well as the appearance of an unassigned peak at ~30 ppm.
- The peak at ~30 ppm would be consistent with the carbon in the thiazolidinone ring.
- There is an overall increase in signal in the carbonyl region of the spectrum (~170 ppm), which would be consistent with the addition of the thiazolidinone ring.

EXAMPLE 2

Scanning electron microscope image of the surface morphology of CTdBE shows a highly porous, pocket shaped surface. This property enhances the adsorption capacity of these compounds to heavy metals compared to the precursor chitosan itself. A respective SEM image of a chitosan derivative according to the present invention is shown in FIG. 1.

EXAMPLE 3

Single Metal Ion Adsorption Experiment 25 mg of CTdBE were added to 100.0 mL of metal acetate solution (initial $M^{2+}$ concentration 10 ppm) with a given pH (pH 4 and pH 6) adjusted with 0.1 M acetic acid, shaked for 24 h at 25° C. and then filtered. The adsorption capacities for metal ions were determined from initial and final concentration of metal ions in the acetate solution determined by atomic absorption spectrophotometry.

Table 1 summarizes up the Single metal ion adsorption capacities of CTdBE for $Pb^{2+}$ and $Hg^{2+}$ which is much higher than that of natural chitosan CTS or the previously reported Schiff base type cross-linked crown ether chitosan CCdBE. This is attributed to that the three-dimensional network of CTdBE provides a cavity tailored to the volumetric space of $Pb^{2+}$ and $Hg^{2+}$ to adsorption.

TABLE 1

Adsorption capacities of CTS, CCdBE and CTdBE for $Pb^{2+}$ and $Hg^{2+}$, each at pH 4 and pH 6.

| Adsorbent | Adsorption capacities (mmol/g) | | | |
|---|---|---|---|---|
| | pH 4 | | pH 6 | |
| | $Pb^{2+}$ | $Hg^{2+}$ | $Pb^{2+}$ | $Hg^{2+}$ |
| CTdBE | 1.10 | 1.31 | 1.38 | 1.78 |
| CTS | 0.82 | 0.33 | 0.94 | 1.48 |
| CCdBE | 0.99 | 1.10 | 1.18 | 1.58 |

EXAMPLE 4

Two Metal Ions Co-Adsorption Experiment 25 mg of CTdBE were added to 100.0 mL of metal acetate solution containing $Pb^{2+}$ and $Hg^{2+}$ ions (initial concentration of single species 5 ppm) at pH 4 and at pH 6, shaked for 24 h at 25° C. and then filtered. The contents of $M^{2+}$ were determined from initial and final concentration of metal ions in the acetate solution determined by atomic absorption spectrophotometry.

Two metal ions ($Pb^{2+}$ and $Hg^{2+}$) co-adsorption results are shown in Table 2. By comparing the selectivity of adsorption of the compound CTdBE with that of compounds CCdBE and CTS, it is found that the adsorption of CTdBE for $Hg^{2+}$ is of higher priority than $Pb^{2+}$ at pH 4 and pH 6 as seen from the results of selectivity coefficient ($K_{Hg/Pb}$) in Table 2. The results further suggest that CTdBE can selectively recognize $Hg^{2+}$, and it is concluded that a selective separation of $Pb^{2+}$ and $Hg^{2+}$ is affected by using an CTdBE better than CCdBE and CTS.

TABLE 2

Adsorption selectivity of CTS, CCdBE and CTdBE for $Pb^{2+}$ and $Hg^{2+}$

| Adsorbent | Adsorption capacities (mmol/g) pH 4 | | Selectivity coefficient | Adsorption capacities (mmol/g) pH 6 | | Selectivity coefficient |
|---|---|---|---|---|---|---|
| | $Pb^{2+}$ | $Hg^{2+}$ | ($K_{Hg^{2+}/Pb^{2+}}$) | $Pb^{2+}$ | $Hg^{2+}$ | ($K_{Hg^{2+}/Pb^{2+}}$) |
| CTdBE | 0.11 | 1.79 | 16.27 | 0.12 | 2.39 | 19.92 |
| CTS | 0.29 | 0.13 | 0.45 | 0.42 | 0.57 | 1.36 |
| CCdBE | 0.12 | 0.96 | 8.00 | 0.13 | 1.38 | 10.62 |

EXAMPLE 5

Reusability Experiment

The crosslinked chitosan CTdBE after adsorption of $Pb^{2+}$ was stirred in 0.1 M HCl for 1 h at 25° C. to remove $Pb^{2+}$, and then was treated with 0.1 M NaOH for 5-8 h. Finally it was filtered and washed with water, ethanol and ether in turn. The CTdBE obtained this way was used in adsorption experiment, and the process was repeated 10 times.

It is observed that the adsorption capacities of CTdBE for $Pb^{2+}$ slightly decreases only after of reuse as high as 10 times. Fortunately, CTdBE changed into sponge shape when left in aqueous solutions at different pHs without any dissolution properties. This property is advantageous in collecting of CTdBE after use and ease of its filtration and dryness followed by extraction of the adsorbent in acidic medium. Repeat of filtration and drying provides CTdBE for a reuse again. This property suggests the invented compound CTdBE for practical application as adsorbent of heavy metals. The practicability of its application arises from its economical usefulness as the starting material for synthesis as chitosan is cheap and naturally occurring and secondly because of its reusability several times in addition to its adsorption capacity and selectivity which is ten times higher than that of CTS itself which is practically in current use as adsorbent.

The features disclosed in the foregoing description, in the claims and the drawing may both separately and in any combination thereof be material for realizing the invention in diverse forms thereof.

The invention claimed is:

1. Chitosan derivative having the repeating unit of formula 1

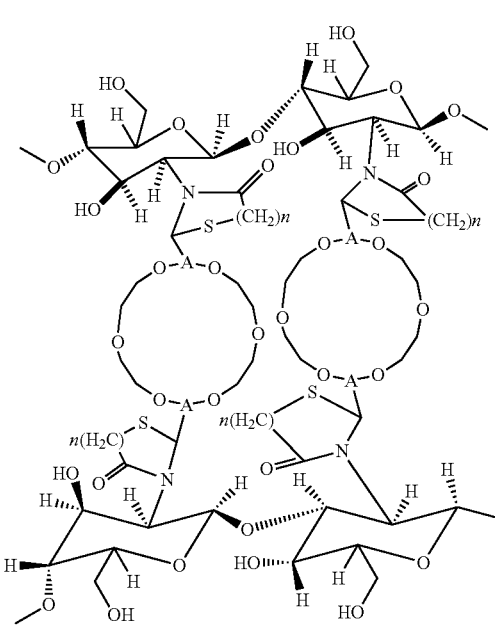

wherein each A is independently selected from

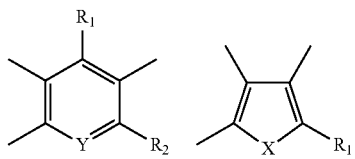

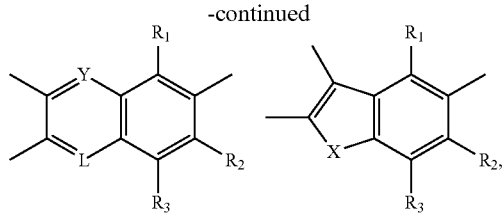

A is vicinally bound to the crown ether, n equals 1 or 2,

X is selected from $CHR_4$, NH, O or S,

Y is selected from $CR_4$ or N,

L is selected from $CR_5$ or N, $R_1$, $R_2$, $R_3$, $R_4$ and $R_5$ are independently selected from hydrogen, halogen, $C_1$-$C_{20}$-alkyl, $C_1$-$C_{20}$-alkoxy, mercapto, alkylthio, alkylamino, arylthio, heteroarylthio, arylamino and heteroarylamino.

2. Method for preparing a chitosan derivative according to claim 1, comprising the step:

a. reacting a cross-linked chitosan crown ether (7) with an alpha-mercapto carboxylic acid and/or a beta-mercapto carboxylic acid to result in a chitosan derivative (1), according to the following scheme 1:

Scheme 1

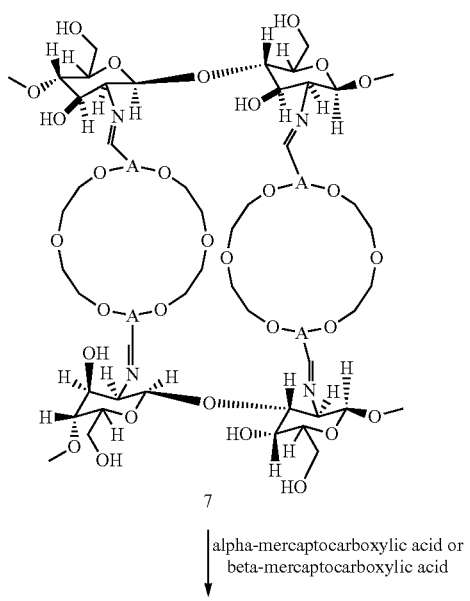

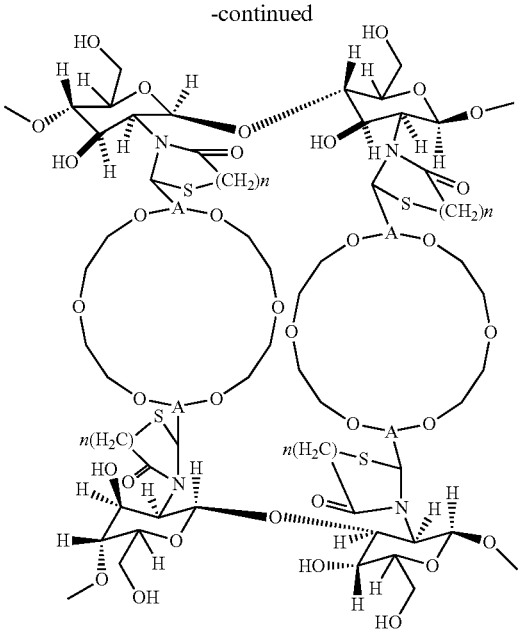

$1; n = 1, 2$ wherein step (i) takes place in the presence of a zinc chloride and an organic solvent in a temperature range from 50-150° C.

3. Method according to claim 2, wherein the alpha-mercaptocarboxylic acid is mercaptoacetic acid.

4. Method according to claim 2, wherein the beta-mercaptocarboxylic acid is beta-mercaptopropionic acid.

5. Method according to claim 2, wherein the organic solvent is 1,4-dioxane.

6. Method according to claim 2, wherein step (i) takes place under microwave irradiation.

7. Method according to claim 6, wherein the power of the microwave irradiation is in a range from 30-300 W.

8. Method according to claim 6, wherein the irradiation time is in a range from 1-60 min.

9. Method of adsorbing metal ions comprising exposing metal ions to the chitosan derivative according to claim 1.

10. Method according to claim 9, wherein the metal ions are heavy metal ions.

11. Method according to claim 9, wherein the chitosan derivative is recycled after adsorption by removal of the metal ions via acidic treatment.

12. Method according to claim 9, wherein the metal ions are removed from water.

13. Method according to claim 9 for the separation of mercury ions from other metal ions by selective adsorption.

* * * * *